United States Patent
Chao et al.

(10) Patent No.: US 9,998,329 B2
(45) Date of Patent: Jun. 12, 2018

(54) INTELLIGENT NETWORK MANAGEMENT DEVICE AND METHOD OF MANAGING NETWORK

(71) Applicant: International Business Machines Corporation, Armonk, NY (US)

(72) Inventors: Chih-Wen Chao, Taipei (TW); Cheng-Ta Lee, Taipei (TW); Wei-Shiau Suen, Taichung (TW); Ming-Hsun Wu, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 46 days.

(21) Appl. No.: 14/807,036

(22) Filed: Jul. 23, 2015

(65) Prior Publication Data
US 2016/0036635 A1 Feb. 4, 2016

(30) Foreign Application Priority Data

Jul. 31, 2014 (TW) .............................. 103126336 A

(51) Int. Cl.
*H04L 12/24* (2006.01)
*H04L 12/801* (2013.01)
(Continued)

(52) U.S. Cl.
CPC ........ *H04L 41/0816* (2013.01); *H04L 47/115* (2013.01); *H04L 47/32* (2013.01); *H04L 63/145* (2013.01); *H04L 63/1416* (2013.01)

(58) Field of Classification Search
CPC ... H04L 41/0816; H04L 45/38; H04L 47/115; H04L 47/2441; H04L 47/32; H04L 63/08; H04L 63/105; H04L 63/14; H04L 63/1408; H04L 63/1416; H04L 63/1425; H04L 63/1441; H04L 63/145; H04L 63/1458; H04L 63/1491; H04L 63/20; H04L 69/22; H04L 2463/146; H04L 63/02;
(Continued)

(56) References Cited

U.S. PATENT DOCUMENTS 7,590,113 B1 * 9/2009 Boxmeyer ............ H04L 63/145
370/235
7,633,909 B1 * 12/2009 Jones .................. H04L 63/0272
370/338

(Continued)

FOREIGN PATENT DOCUMENTS

WO WO2014056200 A1 4/2014

OTHER PUBLICATIONS

"Software-Defined Networking: Why We Like It and How We Are Building on It," White Paper, copyright 2013, Cisco Systems, Inc., 4 pages.

(Continued)

*Primary Examiner* — Eric Nowlin
(74) *Attorney, Agent, or Firm* — Yee & Associates, P.C.; Jeffrey S. LaBaw

(57) ABSTRACT

An intelligent network management device including an analytic unit, conducting an analysis according to received packets in order to determine whether a given event is occurred; and a processing unit, generating and sending a control instruction to a SDN controller to change configurations of a SDN switch when the analytic unit determined the given event has been occurred.

10 Claims, 4 Drawing Sheets

(51) Int. Cl.
*H04L 12/823* (2013.01)
*H04L 29/06* (2006.01)

(58) Field of Classification Search
CPC . H04L 63/0227; H04L 63/10; H04L 63/1466; H04L 63/1483; H04L 2463/144; H04L 45/00; H04L 63/1433; H04W 12/06; H04W 12/08
See application file for complete search history.

(56) References Cited

U.S. PATENT DOCUMENTS

| | | | |
|---|---|---|---|
| 7,808,897 B1 | 10/2010 | Mehta et al. | |
| 7,937,761 B1* | 5/2011 | Bennett | H04L 63/1433 713/153 |
| 8,077,689 B1* | 12/2011 | Jones | H04L 63/0272 370/338 |
| 8,087,083 B1* | 12/2011 | Norris | G06F 21/554 709/206 |
| 8,448,238 B1* | 5/2013 | Gupta | H04L 67/327 726/15 |
| 8,677,473 B2 | 3/2014 | Dennerline et al. | |
| 8,898,748 B2* | 11/2014 | Burks | G06F 9/44505 709/221 |
| 8,955,128 B1* | 2/2015 | Trama | H04L 63/1491 726/23 |
| 9,125,058 B2* | 9/2015 | Jones | H04L 63/0272 |
| 9,166,923 B2* | 10/2015 | DeCusatis | H04L 47/33 |
| 9,203,698 B2* | 12/2015 | Burks | G06F 9/44505 |
| 9,264,301 B1 | 2/2016 | Chua et al. | |
| 9,356,871 B2* | 5/2016 | Medved | H04L 47/122 |
| 9,363,672 B2* | 6/2016 | Bahr | H04L 63/08 |
| 9,461,923 B2* | 10/2016 | Li | H04L 47/2441 |
| 9,749,214 B2* | 8/2017 | Han | H04L 45/02 |
| 9,762,457 B2* | 9/2017 | Chastain | H04L 43/028 |
| 9,762,508 B2* | 9/2017 | Kaufman | H04L 49/15 |
| 9,806,983 B2* | 10/2017 | Civanlar | H04L 45/02 |
| 2006/0153122 A1* | 7/2006 | Hinman | H04L 63/10 370/328 |
| 2010/0299719 A1* | 11/2010 | Burks | G06F 9/44505 726/3 |
| 2012/0027002 A1* | 2/2012 | Jones | H04L 63/0272 370/338 |
| 2013/0125120 A1 | 5/2013 | Zhang et al. | |
| 2013/0298181 A1* | 11/2013 | Smith | H04L 61/2539 726/1 |
| 2013/0298244 A1 | 11/2013 | Kumar et al. | |
| 2013/0311675 A1 | 11/2013 | Kancherla | |
| 2014/0016501 A1 | 1/2014 | Kamath et al. | |
| 2014/0052877 A1 | 2/2014 | Mao | |
| 2014/0075557 A1 | 3/2014 | Balabine et al. | |
| 2014/0112187 A1* | 4/2014 | Kang | H04L 43/024 370/253 |
| 2014/0115706 A1* | 4/2014 | Silva | G06F 9/45533 726/23 |
| 2014/0189074 A1* | 7/2014 | Parker | H04L 63/20 709/220 |
| 2014/0280834 A1* | 9/2014 | Medved | H04L 47/122 709/223 |
| 2014/0317684 A1* | 10/2014 | Porras | H04L 63/20 726/1 |
| 2014/0380415 A1 | 12/2014 | Wang et al. | |
| 2015/0026794 A1* | 1/2015 | Zuk | H04L 63/0227 726/13 |
| 2015/0033340 A1* | 1/2015 | Giokas | H04L 63/1433 726/23 |
| 2015/0052357 A1* | 2/2015 | Bahr | H04L 63/08 713/168 |
| 2015/0163152 A1* | 6/2015 | Li | H04L 47/2441 370/409 |
| 2015/0169340 A1* | 6/2015 | Haddad | G06F 9/45533 718/1 |
| 2015/0222651 A1* | 8/2015 | Fidler | H04L 63/1408 726/22 |
| 2016/0099964 A1* | 4/2016 | Htay | H04L 63/1458 726/23 |
| 2016/0119228 A1* | 4/2016 | Gao | H04L 47/2408 370/392 |
| 2016/0142226 A1* | 5/2016 | Huang | H04L 12/4633 370/392 |
| 2016/0149774 A1* | 5/2016 | Chastain | H04L 43/028 370/241 |
| 2016/0182541 A1* | 6/2016 | Lim | H04L 43/026 726/23 |
| 2016/0226769 A1* | 8/2016 | McCormick | H04L 65/601 |
| 2016/0269432 A1* | 9/2016 | Lin | H04L 63/1458 |
| 2016/0285972 A1* | 9/2016 | Puttagunta | H04L 67/1097 |
| 2016/0330077 A1* | 11/2016 | Jin | H04L 41/0806 |
| 2016/0337896 A1* | 11/2016 | Rajagopalan | H04L 41/0893 |
| 2016/0344620 A1* | 11/2016 | G. Santos | H04L 45/28 |
| 2017/0048200 A1* | 2/2017 | Chastain | H04L 63/0272 |
| 2017/0099196 A1* | 4/2017 | Barsheshet | H04L 69/161 |
| 2017/0149659 A1* | 5/2017 | K | H04L 45/02 |
| 2017/0149843 A1* | 5/2017 | Amulothu | G06F 9/45558 |
| 2017/0150362 A1* | 5/2017 | Clemenson | H04L 41/0806 |
| 2017/0155708 A1* | 6/2017 | Chi | H04L 41/00 |
| 2017/0187688 A1* | 6/2017 | Hodroj | H04L 63/0272 |
| 2017/0195257 A1* | 7/2017 | Annaluru | H04L 49/253 |
| 2017/0195292 A1* | 7/2017 | Pham | H04L 63/0245 |
| 2017/0207994 A1* | 7/2017 | Lin | H04L 45/02 |
| 2017/0237653 A1* | 8/2017 | Agarwal | H04L 45/26 370/254 |
| 2017/0272367 A1* | 9/2017 | Kozat | H04L 47/50 |
| 2017/0279884 A1* | 9/2017 | Yang | H04L 67/1034 |
| 2017/0295074 A1* | 10/2017 | Chandran | H04L 43/026 |
| 2017/0295207 A1* | 10/2017 | Yu | H04L 63/20 |
| 2017/0324584 A1* | 11/2017 | Li | H04L 12/64 |
| 2017/0324585 A1* | 11/2017 | Hyatt | H04L 29/08 |
| 2017/0339109 A1* | 11/2017 | Zeng | H04L 63/0263 |
| 2017/0346716 A1* | 11/2017 | Zheng | H04L 69/16 |
| 2017/0353373 A1* | 12/2017 | Agarwal | H04L 43/0876 |
| 2017/0373951 A1* | 12/2017 | Chastain | G06F 9/45558 |
| 2018/0007075 A1* | 1/2018 | Wackerly | H04L 63/1425 |

OTHER PUBLICATIONS

"TippingPoint Next-Generation Intrusion Prevention System (IPS)," Hewlett-Packard Development Company, L.P., undated, 6 pages. Accessed Apr. 22, 2014, http://www8.hp.com/us/en/software-solutions/ips-intrusion-prevention-system/.

Dixon et al., "Software defined networking to support the software defined environment," IBM Journal of Research and Development, vol. 58, No. 2/3, Mar./May 2014, pp. 3:1-3:14.

Kerner, "Software Defined Networking and OpenFlow can Provide Real Security," InternetNews.com. May 15, 2012, 1 page. http://www.internetnews.com/infra/software-defined-networking-and-openflow-can-provide-real-security.html.

Li et al., "Toward Software-Defined Cellular Networks," 2012 European Workshop on Software Defined Networking (EWSDN), Oct. 2012, 6 pages.

Office Action, dated Apr. 4, 2018, regarding U.S. Appl. No. 15/805,193, 37 pages.

* cited by examiner

INTELLIGENT NETWORK MANAGEMENT DEVICE AND METHOD OF MANAGING NETWORK

This application is based on and claims the benefit of priority from Taiwan Patent Application 103126336 filed on Jul. 31, 2014.

BACKGROUND OF THE INVENTION

Field of the Invention

The invention generally relates to an intelligent network management device, and more particularly, to an intelligent network management device disposed in a software-defined network (SDN) and interacting with a SDN controller.

Description of the Prior Art

For the efficient operation and information security in networks, large enterprises or organizations have widely disposed intelligent network management devices in network architectures to provide, for example, intrusion detection and prevention, firewalls, load balancing, etc. In general, intelligent network management devices are preferably implemented by forms of appliances. In comparison with general-purpose computer devices, appliances are generally designed according to specific purposes or services and have higher efficiency.

For conventional intelligent network management devices, intrusion detection and prevention systems and firewall systems of IBM may be referred to. U.S. Pat. Nos. 7,808,897 and 8,677,473 owned by the same may also be referred to for related prior art.

As for SDN, the article "Software-Defined Networking: Why We Like It and How We Are Building On It." published by Cisco may serve as a reference. Unlike conventional networks that mostly rely on network elements, SDN carries out network control by application programs (i.e., SDN controllers and SDN switches); each SDN switch follows a flow table predetermined by the SDN controller to carry out different actions on different packets, such as pass, block, or goto. In prior art such as US Patent application No. 2013/0311675, the SDN controller may selectively use other devices as detection devices to observe network situations depending on the status, and determine whether to adjust the flow table of the SDN switch according to feedbacks generated by these devices to optimize network operation. However, such a practice is actually not practicable, since this departs from the functional scope of conventional SDN controllers, and it is impossible in practice to additionally equip the SDN controller with sufficient capability to handle all kinds of network situations under conventional SDN controller architectures, especially when network attack schemes are persistently improving.

SUMMARY OF THE INVENTION

The invention proposes an intelligent network management device, and more particularly, an intelligent network management device disposed in a software-defined network (SDN) and interacting with a SDN controller.

An embodiment discloses an intelligent network management device comprising:
  an analytic unit, conducting an analysis according to packets received to determine whether a given event has occurred; and
  a processing unit, generating and sending an instruction to a SDN controller to change configurations of a SDN switch when the analytic unit determines that the given event has occurred.

In addition to the above intelligent network management device, the present invention also includes a method and a computer program product for the use of the above intelligent network management device.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings.

DETAILED DESCRIPTION OF THE EMBODIMENTS

Figure 1:
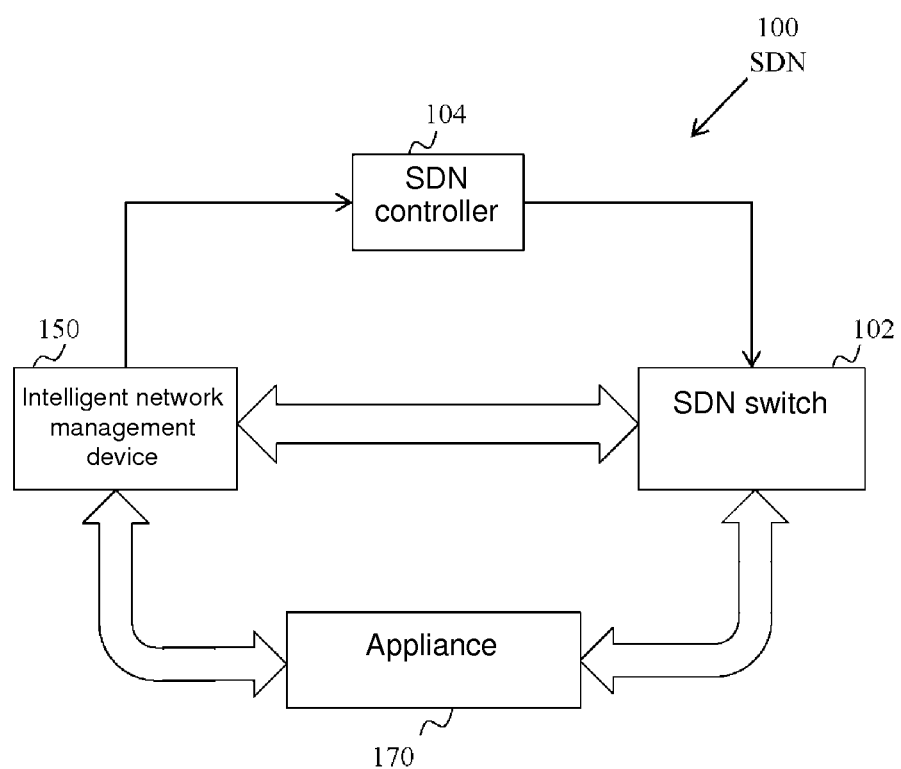
FIG. 1 shows a software-defined network of an embodiment of the invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

As will be appreciated by one skilled in the art, the present invention may be embodied as a computer system/device, a method or a computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

In view of the differences between SDN and conventional network control schemes, it is recognized that a new scheme is required to handle network management requirements (such as intrusion detection and prevention, firewalls, and load balancing).

On the other hand, when the intelligent network management device determines that an anomaly occurred in the network in prior art, it is generally reported to the network manager and relies on human intervention to handle it. Certain intelligent network management devices such as intrusion prevention systems may further take prevention actions automatically to handle the network anomaly itself in addition to detecting the network anomaly, such as blocking the sending of specific packets. However, when the intrusion prevention system takes prevention actions, resources of the system itself may also be occupied, and actions that may be taken by the intrusion prevention system in prior art have scopes limited to itself only. In view of this, since the intrusion prevention system may easily communicate with the SDN controller under the SDN architecture, when the intrusion prevention system or other intelligent network management devices detect a network anomaly, an instruction may be actively sent to the SDN controller, and the SDN controller takes actions to handle the network anomaly by instructing a corresponding network element on the SDN (such as a SDN switch) according to the content of the instruction after receiving the instruction.

In other words, by the intermediation of the SDN controller, the SDN switch may act as an extension of the intrusion prevention system to carry out the prevention actions required by the intrusion prevention system.

Such a scheme may be more efficient in addition to saving system resources of the intelligent network management device; for example, network attack packets may be blocked before the intrusion prevention system, and network resources (i.e., network resources between the SDN switch and the intelligent network management device) wasted to further send the network attack packets to the intelligent network management device may be saved, and quarantine effects may be achieved by preventing such network resources from being attacked.

In comparison with prior art, the scheme of the present invention is particularly advantageous in network security fields, since the intelligent network management device itself is designed to have sufficient knowledge to detect and handle all kinds of network situations including varieties of network attacks. In addition, when the intelligent network management device detects an attack, protection actions may be carried out by instructing the SDN switch (via the SDN controller) in real time. On the contrary, in prior art (such as US Patent Application No. 2013/0311675), further determination by the SDN controller is required and the critical timing may be missed.

An embodiment discloses an intelligent network management device comprising:
 an analytic unit, conducting an analysis according to packets received to determine whether a given event has occurred; and
 a processing unit, generating and sending an instruction to a SDN controller to change configurations of a SDN switch when the analytic unit determines that the given event has occurred.

In addition to the above intelligent network management device, the present invention also includes a method and a computer program product for the use of the above intelligent network management device.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention. The following description, the appended claims, and the embodiments of the present invention further illustrate the features and advantages of the present invention.

Figure 2:
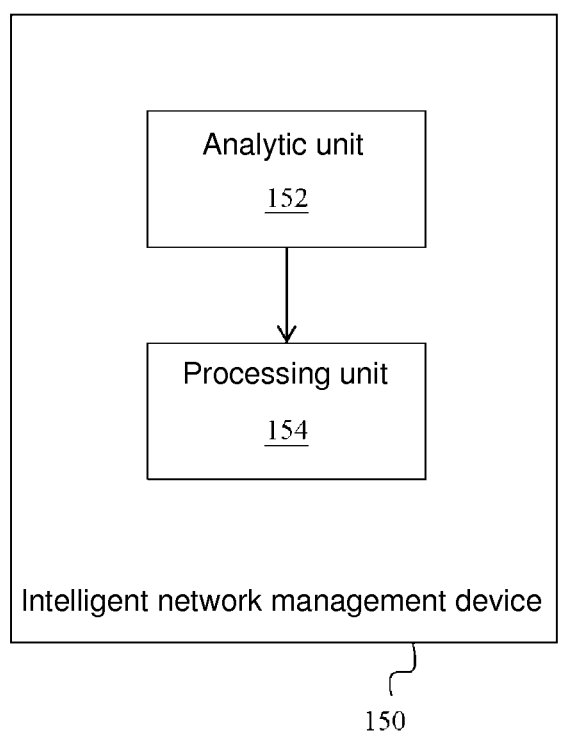
FIG. 2 shows an intelligent network management device of an embodiment of the invention.
Figure 3:
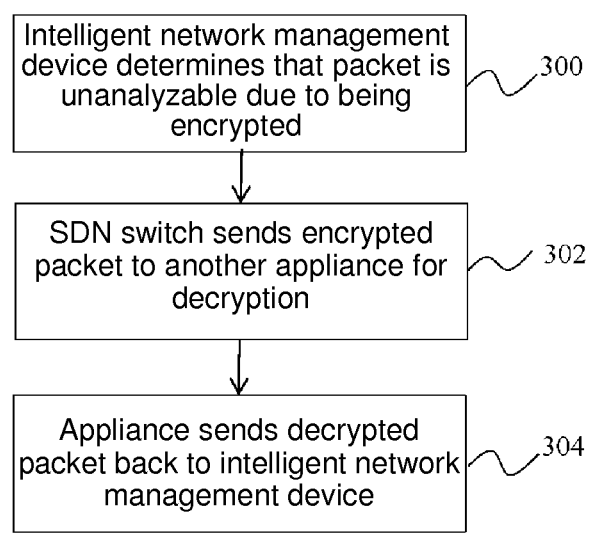
FIG. 3 shows a flowchart of a method of an embodiment of the invention.

Referring now to FIG. 1 through FIG. 3, computer systems/devices, methods, and computer program products are illustrated as structural or functional block diagrams or process flowcharts according to various embodiments of the present invention. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

<System Architecture>

FIG. 1 shows the architecture of a software-defined network (SDN) 100 of an embodiment. For the purpose of simplifying the description, FIG. 1 only shows the SDN 100 to comprise a SDN switch 102, a SDN controller 104, an intelligent network management device 150, and an appliance 170. More particularly, the intelligent network management device 150 may be directly connected to the SDN controller 104 or via other network elements (not shown). In addition, in actual applications, the SDN 100 may comprise more SDN switches, SDN controllers, and intelligent network management devices. Furthermore, although not shown in FIG. 1, it may be understood that other network elements may be disposed between the SDN switch 102 and the intelligent network management device 150, such as other SDN switches. The appliance 170 shall be described later with reference to FIG. 3.

For basic details of the SDN 100 not directly related to the present invention, US Patent application No. 2013/0311675 or the article "Deploy IBM Security Network Protection in an Open vSwitch" published by IBM may serve as references, and the details are not repeated here.

FIG. 2 further shows the intelligent network management device 150. In this embodiment, the intelligent network management device 150 is implemented with an intrusion prevention system (IPS), but the invention is not limited thereto. For example, the intelligent network management device 150 may also be implemented as a firewall device or a load-balancing device.

As shown in FIG. 2, the intelligent network management device 150 comprises an analytic unit 152 and a processing unit 154. The analytic unit 152 and the processing unit 154 are function units in the intelligent network management device 150, and may be implemented by specific hardware circuits or as application programs by program codes saved in a non-volatile memory in the intelligent network management device 150.

Analysis engines in conventional IPS may be used as references for the analytic unit 152, which may determine whether an intrusion, attack, or other network-security-related event has occurred according to received packets. For instance, the analytic unit 152 may be implemented as a SNORT or PAM analysis engine.

In addition to network-security-related events, in other embodiments, the analytic unit 152 may also determine whether an event related to the operation situation of the intelligent network management device 150 has occurred. For instance, the analytic unit 152 may determine whether a congestion event has occurred in the intelligent network management device 150 according to the number of packets received by the intelligent network management device 150 and the number of packets that may be handled by the intelligent network management device 150 at the instant. For the determination of congestion, U.S. Pat. No. 7,808,897 owned by the applicant may serve as a reference.

It is worthy of mentioning that, in another embodiment, when the content of the received packet is unanalyzable by the analytic unit 152 due to being encrypted or other reasons, the analytic unit 152 may also accordingly determine that an unanalyzable-packet event has occurred.

After the analytic unit determines that the aforementioned events have occurred, the processing unit 154 is notified and determines the corresponding action. For example, when the analytic unit 152 determines that an attack event has occurred, the processing unit 154 may determine that the intelligent network management device 150 itself should block the received packets, or the processing unit 154 may generate and send an instruction to the SDN controller 104 to instruct one or multiple SDN switches 102 of the SDN 100 to block subsequent attack packets. Generally speaking, when the analytic unit 152 determines that an attack event has occurred, the network address of a source of the attack event and the protocol used by the packet may be known, and thus the processing unit 154 may provide such information to the SDN controller 104 so that the SDN controller 104 correspondingly changes configurations (such as the flow table) of a specific SDN switch 102; therefore, the SDN switch 102 may handle packets matching specific conditions (such as source address, port, protocol, etc.), and thus subsequent attack packets may be blocked without requiring the intelligent network management device 150 to block the subsequent attack packets itself. For flow tables of the SDN switch, the OpenFlow Switch Specification published by the Open Networking Foundation may serve as a reference.

In this embodiment, since both the intelligent network management device 150 and the SDN switch 102 have capability of blocking attack packets, the processing unit 154 may determine whether it is suitable to prefer to let the SDN switch 102 block the subsequent attack packets, especially considering that sometimes the SDN switch 102 might also block other non-attack packets via the flow table. Therefore, when the load of intelligent network management device 150 permits, the intelligent network management device 150 may be preferred to carry out the subsequent blocking actions; when the load of intelligent network management device 150 is high, the SDN switch 102 may be preferred to carry out the blocking actions.

In another embodiment, when the analytic unit 152 determines that a congestion event has occurred in the intelligent network management device 150, the processing unit 154 may generate and send an instruction to the SDN controller 104 to instruct one or multiple SDN switches 102 of the SDN 100 to let packets with lower priority levels bypass the intelligent network management device 150 and continue to be sent to the destination, so as to reduce the network flow handled by the intelligent network management device 150. The priority levels of the packets may be predetermined by the processing unit 154 according to the source address, port, and protocol. For instance, the processing unit 154 may assign a lower priority level to packets adopting Streaming Media Protocol, since such communications generally occupy large bandwidths and have fewer security problems. Stop sending such packets to the intelligent network management device 150 should ease the congestion issue.

<Method Flow>

Another embodiment of the invention is described by the flowchart in FIG. 3 and referring to the devices shown in FIG. 1 and FIG. 2.

Step 300: the analytic unit 152 conducts an analysis according to a packet received by the intelligent network management device 150. In this embodiment, the packet is encrypted (such as by SSL encryption) at the source end so that the content of the packet is unanalyzable by the analytic unit 152, and thus the analytic unit 152 accordingly determines that an unanalyzable-packet event has occurred and notifies the processing unit 154.

Step 302: the processing unit 154 generates and sends an instruction to the SDN controller 104 so that the SDN controller 154 instructs the SDN switch 102 to send all packets encrypted by SSL to the appliance 170 for pre-processing, and then proceed to Step 304. It is worthy to mention that, in other embodiments, the SDN switch 102 may also let SSL-encrypted packets directly bypass the intelligent network management device 150 and continue to be sent to the destination to reduce the load of the intelligent network management device 150.

Step 304: in this embodiment, the appliance 170 may decrypt the SSL-encrypted packets and send the decrypted packets back to the intelligent network management device 150. The packets decrypted by the appliance 170 may be directly sent to the intelligent network management device 150 for analysis, or be sent to the SDN switch 102 to let the SDN switch 102 send them back to the intelligent network management device 150 according to settings or the flow table.

Figure 4:
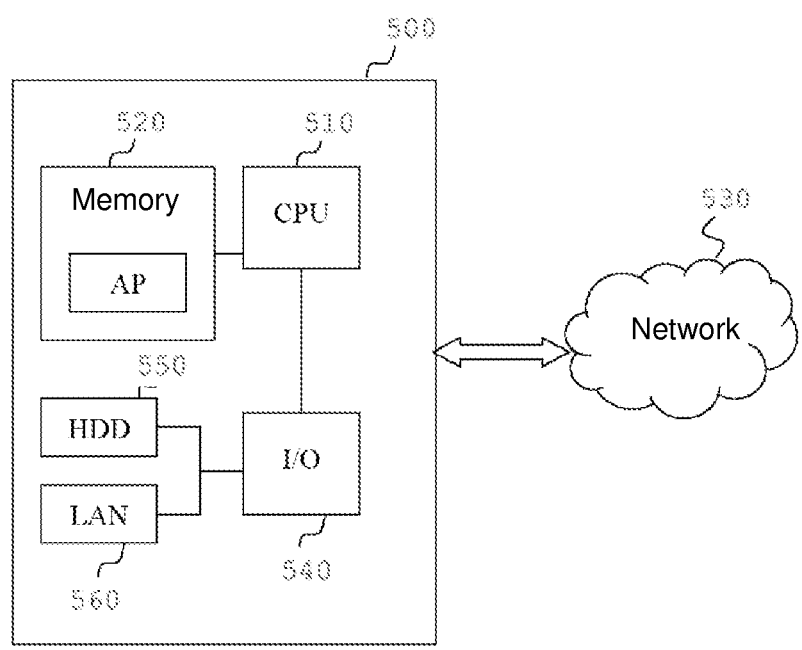
FIG. 4 shows an intelligent network management device of an embodiment of the invention.

FIG. 4 further shows a hardware environment block diagram of an appliance 500 which may be the appliance 170 in FIG. 2.

In one embodiment, the appliance 500 has a processor to execute dedicated application programs; a storage device to save various information and program codes; a communication and input/output device to act as an interface for users to communicate with; and peripheral devices or other specific usage devices. In other embodiments, the present invention may also be implemented with other forms and have more or less apparatuses or devices.

As shown in FIG. 4, the appliance 500 may have a processor 510, a memory 520, and an input/output (I/O) unit 540. The I/O bus may be a high-speed serial bus such as a PCI-e bus, yet other bus architectures may also be used. Other connections to the I/O bus may be connected directly to the devices or through expansion cards. The I/O unit 540 may also be coupled to a hard disk 550 or a local area network (LAN) adaptor 560. By the LAN adaptor 560, the appliance 500 may communicate with other computer devices through a network 530. The network 530 may be implemented with any type of connection including static LAN connections or wide area network (WAN) connections or dialup networking by Internet service providers; the connection scheme is also not limited and may include wired or wireless connections such as communications with user computers by wireless networks of GSM or Wi-Fi. However, it should be understood that other hardware and software components (such as additional computer systems, routers, firewalls, etc.) may be included in the network despite not being shown in the figures. The memory 520 may be a random access memory (RAM), a read-only memory (ROM), or an erasable programmable read-only memory (EPROM or Flash memory). The memory 520 is used to save an operating system, program codes of a dedicated main program AP, and all kinds of information. The operating system is executed on the processor 510 and coordinates and provides control of various devices in the appliance 500; the processor 510 may access the memory 520 to execute the main program AP to implement the analytic unit 152 and the processing unit 154 in FIG. 2 or carry out the steps of the method shown in FIG. 3.

Those skilled in the art may understand that the hardware of the appliance 500 in FIG. 4 may have various modifications according to different embodiments. Other internal hardware or peripheral devices such as Flash ROM, equivalent non-volatile memory, optical drive, etc. may be added to or replace the hardware shown in FIG. 4.

The present invention can be embodied in any other specific manners without departing from the spirit or essential features of the present invention. Every aspect of the aforesaid embodiments of the present invention must be deemed illustrative rather than restrictive of the present invention. Hence, the scope of the present invention is defined by the appended claims instead of the above description. All equivalent meanings and scope which fall within the appended claims must be deemed falling within the scope of the appended claims.

What is claimed is:

1. An intelligent network management device, disposed in a software-defined network (SDN) and connected to a SDN switch and a SDN controller used to control the SDN switch, the intelligent network management device comprising an analytic unit portion and a processing unit portion, wherein:
the analytic unit portion of the intelligent network management device is configured to conduct an analysis according to packets received by the intelligent network management device via the SDN switch to determine whether a given event has occurred and notify the processing unit portion of the intelligent network management device when the given event is determined to have occurred; and the processing unit portion of the intelligent network management device is configured to generate and send an instruction to the SDN controller to change configurations of the SDN switch when the analytic unit portion of the intelligent network management device determines that the given event has occurred, wherein the configurations of the SDN switch are changed by the processing unit portion as directed by the analytic unit portion when the analytic unit portion determines that the given event has occurred so that the SDN switch sends packets originally destined to the intelligent network management device to another device on the SDN.

2. The intelligent network management device as claimed in claim 1, wherein the intelligent network management device is an intrusion prevention system (IPS) device.

3. The intelligent network management device as claimed in claim 1, wherein the instruction is an instruction to change configurations of the SDN switch to block subsequent attack packets, and wherein the processing unit portion of the intelligent network management device sends the instruction to the SDN switch instructing the SDN switch to block the subsequent attack packets.

4. The intelligent network management device as claimed in claim 1, wherein the intelligent network management device and the SDN switch are operatively coupled to an appliance.

5. The intelligent network management device as claimed in claim 4, wherein the intelligent network management device is configured to receive decrypted packets decrypted by the appliance.

6. An intelligent network management device, disposed in a software-defined network (SDN) and connected to a SDN switch and a SDN controller used to control the SDN switch, the intelligent network management device comprising an analytic unit portion and a processing unit portion, wherein:
the analytic unit portion of the intelligent network management device is configured to conduct an analysis according to packets received by the intelligent network management device via the SDN switch to determine whether a given event has occurred and notify the processing unit portion of the intelligent network management device when the given event is determined to have occurred; and
the processing unit portion of the intelligent network management device is configured to generate and send an instruction to the SDN controller to change configurations of the SDN switch when the analytic unit portion of the intelligent network management device determines that the given event has occurred, wherein the configurations of the SDN switch are changed so that the SDN switch at least affects subsequent packets sent to the intelligent network management device in the SDN, and wherein the given event determined by the analytic unit portion of the intelligent network management device is a congestion event and the configuration of the SDN switch is changed by the SDN controller such that the SDN switch accordingly stops sending packets matching a predetermined condition to the intelligent network management device.

7. A network management method, used in the intelligent network management device comprising an analytic unit configured to conduct an analysis according to packets received by the intelligent network management device via a software-defined network (SDN) switch to determine whether a given event has occurred; and a processing unit configured to generate and send an instruction to an SDN controller configured to change configurations of the SDN switch when the analytic unit determines that the given event has occurred, the method comprising:
conducting an analysis according to packets received by the intelligent network management device via the SDN switch to determine whether a given event has occurred and notifying the processing unit when the given event is determined to have occurred; and
generating and sending an instruction to the SDN controller to change configurations of the SDN switch when the analytic unit determines that the given event has occurred, wherein the configurations of the SDN switch are changed by the processing unit portion as directed by the analytic unit portion when the analytic unit portion determines that the given event has occurred so that the SDN switch sends packets originally destined to the intelligent network management device to another device on the SDN.

8. A computer program product comprising a non-transitory computer usable storage device having program code embodied thereon that is configured to perform, when executed by a data processor, the method of claim 7.

9. An intelligent network management device, disposed in a software-defined network (SDN) and connected to a SDN switch and a SDN controller used to control the SDN switch, the intelligent network management device comprising an analytic unit portion and a processing unit portion, wherein:
the analytic unit portion of the intelligent network management device is configured to conduct an analysis according to packets received by the intelligent network management device via the SDN switch to determine whether a given event has occurred and notify the processing unit portion of the intelligent network management device when the given event is determined to have occurred; and
the processing unit portion of the intelligent network management device is configured to generate and send an instruction to the SDN controller to change configurations of the SDN switch when the analytic unit portion of the intelligent network management device determines that the given event has occurred, wherein the intelligent network management device is configured to block packets received from the SDN switch, and wherein the processing unit portion of the intelligent network management device is configured to select, based on a load of the intelligent network management device, one of the intelligent network management device and the SDN switch to block packets.

10. An intelligent network management device, disposed in a software-defined network (SDN) and connected to a SDN switch and a SDN controller used to control the SDN switch, the intelligent network management device comprising an analytic unit portion and a processing unit portion, wherein:
the analytic unit portion of the intelligent network management device is configured to conduct an analysis according to packets received by the intelligent network management device via the SDN switch to determine whether a given event has occurred and notify the processing unit portion of the intelligent network management device when the given event is determined to have occurred; and
the processing unit portion of the intelligent network management device is configured to generate and send an instruction to the SDN controller to change configurations of the SDN switch when the analytic unit portion of the intelligent network management device determines that the given event has occurred, wherein the intelligent network management device is configured to block packets received from the SDN switch, and wherein the given event determined by the analytic unit portion of the intelligent network management device is a congestion event, and the processing unit portion of the intelligent network management device instructs the SDN switch to let packets with lower priority levels bypass the intelligent network management device and continue to be sent to a destination so as to reduce network flow handled by the intelligent network management device.

* * * * *